United States Patent [19]

Johnson

[11] Patent Number: 5,757,246
[45] Date of Patent: May 26, 1998

[54] METHOD AND APPARATUS FOR SUPPRESSING PASSIVE INTERMODULATION

[75] Inventor: Eric Norman Johnson, Buckingham, Canada

[73] Assignee: EMS Technologies, Inc., Norcross, Ga.

[21] Appl. No.: 396,158

[22] Filed: Feb. 27, 1995

[51] Int. Cl.⁶ .............................. H04B 3/28; H01Q 1/50
[52] U.S. Cl. .......................... 333/12; 333/24 C; 333/260; 343/700 MS
[58] Field of Search ............................... 333/12, 24 C, 333/126, 129, 132, 260; 343/700 MS

[56] References Cited

U.S. PATENT DOCUMENTS

| | | | |
|---|---|---|---|
| 2,470,016 | 5/1949 | Clapp | 343/817 |
| 3,545,001 | 12/1970 | Giller | 343/776 |
| 3,546,705 | 12/1970 | Lemson | 343/797 |
| 3,681,770 | 8/1972 | Alford | 343/815 |
| 3,742,512 | 6/1973 | Munson | 343/814 |
| 3,757,344 | 9/1973 | Pereda | 333/24 C X |
| 3,836,977 | 9/1974 | Wheeler | 343/815 |
| 4,089,817 | 5/1978 | Kirkendall | 343/713 |
| 4,097,868 | 6/1978 | Borowick | 343/727 |
| 4,130,823 | 12/1978 | Hoople | 343/768 |
| 4,186,400 | 1/1980 | Cermignani et al. | 343/708 |
| 4,516,132 | 5/1985 | Bond et al. | 343/815 |
| 4,740,793 | 4/1988 | Wolfson et al. | 343/700 MS |
| 4,912,482 | 3/1990 | Woloszcuk | 343/841 |
| 4,918,457 | 4/1990 | Gibson | 343/700 MS |
| 5,041,838 | 8/1991 | Liimatainen | 343/700 MS |
| 5,111,214 | 5/1992 | Kumpfbeck et al. | 343/841 |
| 5,216,430 | 6/1993 | Rahm et al. | 343/700 MS |
| 5,241,322 | 8/1993 | Gegan | 343/700 MS |
| 5,309,164 | 5/1994 | Dienes et al. | 343/700 MS |
| 5,319,378 | 6/1994 | Nalbandian et al. | 343/700 MS |
| 5,325,103 | 6/1994 | Schuss | 343/700 MS |

OTHER PUBLICATIONS

"Passive Intermodulation Product Generation in High Power Communications Satellites", by Christopher F. Hober, David L. Pollard, and Robert R. Nicholas, published by the American Institute of Aeronautics and Astronautics, Inc., copyright 1985.

*Primary Examiner*—Robert Pascal
*Assistant Examiner*—Barbara Summons
*Attorney, Agent, or Firm*—Jones & Askew, LLP

[57] ABSTRACT

A method and apparatus for suppressing the generation of passive intermodulation within passive devices. A dielectric sheet comprising dielectric material is placed between first and second conductive elements of the passive device. The second conductive element is then mounted to the first conductive element, thereby "sandwiching" the dielectric sheet between the first and second conductive elements. In this manner, a direct contact connection can not be formed at the junction of the first conductive element and the second conductive element. This absence of a continuous direct contact minimizes the opportunity for passive intermodulation products to be generated at this junction of the passive device.

19 Claims, 8 Drawing Sheets

METHOD AND APPARATUS FOR SUPPRESSING PASSIVE INTERMODULATION

TECHNICAL FIELD

The present invention relates generally to transmission and reception of electromagnetic signals, and relates more particularly to a method and apparatus for suppressing the generation of intermodulation products in passive devices operating within the environment of high power transmit/receive equipment.

BACKGROUND OF THE INVENTION

Harmonically-related spurious signals can be generated by a nonlinear device in response to two or more input signals. These spurious signals, which are often called intermodulation products or intermodulation distortion, are generated as a result of the nonlinear characteristics of a device. The frequencies of these spurious signals represent products of the different frequencies associated with the input signals and their amplitudes are a function of the amplitudes of the input signals and the power output capability of the device.

Active intermodulation distortion is a well known phenomenon for "active" devices, such as amplifiers and mixers. Vendors of amplifiers, for example, specify intermodulation characteristics for their amplifier products. The signal conversion operations of mixers exploit the active intermodulation on phenomenon to up-convert or down-convert signals. Indeed, in the field of transmitter/receiver systems, the mixing, of two or more desired signals is an inherent function of the modulation/demodulation process. However, for some operating environments, such as the communications field, the generation of "unintended" intermodulation products can interfere with the processing of desired signals. In general, little can be done to prevent the generation of actively-generated intermodulation products. Accordingly, designers of communications systems typically establish by calculation a fixed relationship between a particular active intermodulation product and the operating environment of the communication system.

The generation of intermodulation products also can occur within "passive" devices operating within high power environments. In general, it will be appreciated that a signal can pass from the input of a passive device to its output without any distortion of the electrical characteristics of the signal. This assumption remains valid for the application of low power signals to a passive device. However, if the power level of signals applied to the passive device exceeds approximately one Watt, then a potential exists for the generation of passive intermodulation products. A typical passive device susceptible to the generation of passive intermodulation products is an antenna capable of supporting both receive and transmit functions, i.e., a diplex antenna, for a cellular telephone communications system capable of high power, multiple channel operations.

Passive intermodulation can occur when the voltage-current relationship for a passive device becomes nonlinear. For example, a diplex antenna can include one or more metal-to-metal junctions formed by joining two nominally flat metals surfaces with a pressure joint. At a microscopic level, the contact of these conductive surfaces is accomplished by a large number of point contacts formed by the crystal structures of these metal surfaces. Current can flow through these point contacts when an external voltage is applied to the metal-to-metal junction formed by these surfaces. As the power level of this external signal increases, the point contacts operate as a rectifier by limiting the amount of current that flows within this junction, and current flow becomes nonlinear. In this manner, the direct "physical" contact of conductive surfaces can lead to the generation of passive intermodulation products.

During nonlinear operations of the passive device, if a signal of a frequency $f_1$ is applied to the passive device, the passive device can generate "images" of this signal at integer multiples of the frequency for the input signal, i.e., $1f_1; 2f_1; 3f_1;$ and so forth. If a second signal having a second frequency $f_2$ is then applied, the passive device will generate signals at integer multiples of $f_1, f_2,$ and mixed products of $f_1$ and $f_2$. The "unintended" mixed product signals represent additive or subtractive sums of the integer frequencies, i.e., $2f_1+/-f_2; 3f_1+/-2f_2; \ldots 5f_2+/-4f_1;$ and so forth. It will be appreciated that these intermodulation products can present a significant interference problem in the communications field because they can appear within the receive frequency band of a transmit/receive system.

For the representative example of a cellular telephone communications system, which typically includes multiple transmit channel capability, at least a portion of the intermodulation products can represent signals having frequencies that fall within the receive band of the cellular telephone communications system. While the signal amplitudes associated with these intermodulation products may be relatively small in comparison to the transmit power level, these undesired signals may nevertheless lead to interference with the reception of desired signals. Specifically, the receiver of the communications system may be receiving desired signals at or near the level of these intermodulation products. Thus, the intermodulation products can seriously impact receiver sensitivity and thereby degrade communications system performance.

Passive intermodulation products can behave quite differently from active intermodulation products because the passive intermodulation phenomenon can be influenced by temperature and time variations. In addition, passive intermodulation products can behave in an unpredictable fashion when the power level of signals applied to the passive device is varied. Thus, unlike "well behaved" active intermodulation products, it is almost impossible to establish by calculation a fixed relationship between a given passive intermodulation product and test conditions. The unpredictable nature of the passive intermodulation phenomenon, as well as the interference problems associated with the reception of "unintended" intermodulation products, makes it desirable to attempt to suppress the generation of passive intermodulation products.

Focusing upon a diplex antenna for the cellular telephone communications system, it will be appreciated that this passive device can include numerous point contacts formed by metal-to-metal joints. One critical point contact region is the direct-contact junction formed by the antenna surface and a connector for connecting the antenna to the communications system via a transmission line or "feed" cable. Prior techniques for suppressing passive intermodulation products generated at this antenna connector junction include (1) connecting the male connector of the feed cable to the female antenna connector or "receptacle" with sufficient pressure to insure intimate contact of the connector surfaces in the formed joint; or (2) fusing or otherwise bonding the male cable connector to the female antenna connector by conventional fusing, welding, or soldering techniques. The first technique represents the use of high contact pressure to increase the effective contact surface for the conductive surfaces of the male and female antenna connectors. The second technique relies upon the rigid connection of similar conductive surfaces to achieve a bonded joint. Both techniques focus upon supplying a rigid bond at this antenna connection point to provide a "direct contact"-type-connection of conductive surfaces.

For each of these prior techniques, the joint formed by the connection of the feed cable to the antenna is effectively deformed, thereby substantially inhibiting the opportunity to disconnect the antenna from the feed cable during future antenna maintenance operations. The first technique results in the deformation of the threads of the antenna connectors, whereas the second technique supplies a relatively permanent joint. Both prior techniques fail to offer the opportunity to repeatedly form the joint between the antenna connector and the feed cable connector. Another disadvantage of the second technique is that compatible conductive surfaces are generally required to form a proper bonded joint. Accordingly, the prior techniques fail to supply a robust solution to the suppression of passive intermodulation.

In view of the foregoing, there is a need for a passive intermodulation suppression technique that supports the connection of conductive surfaces without requiring a direct contact between these surfaces. There is also a need for a passive intermodulation suppression technique that does not deform or otherwise fuse the connection of conductive surfaces in a passive device. Likewise, there is also a need for a passive intermodulation suppression technique which produces a repeatable and serviceable connection between conductive surfaces of a passive device. The present invention addresses these needs by supporting capacitive coupling of junctions formed by conductive surfaces in a passive device.

SUMMARY OF THE INVENTION

The foregoing needs for an improved passive intermodulation suppression technique are satisfied by the present invention, which uses capacitive coupling rather than a direct contact connection for junctions formed by conductive surfaces in a passive device. Significantly, the generation of passive intermodulation products can be suppressed by avoiding the use of direct or "continuous" contact connections of conductive surfaces within a passive device. Accordingly, the present invention addresses the problem of passive intermodulation suppression by the use of a "capacitive" joint formed by the placement of a dielectric material between two "plates" supplied by conductive surfaces of the passive device. This connection of conductive surfaces in a passive device can be viewed as a "parallel plate" capacitive element.

Briefly described, the present invention is particularly useful in the environment of a passive device that supports the transmission and reception of high power electromagnetic signals, i.e., a transmit/receive device for handling signals having power levels that exceed one Watt. To suppress passive intermodulation distortion generated during transmission operations, thereby reducing interference within the receive frequency band, the present invention places a dielectric sheet comprising dielectric material between first and second conductive elements of the transmit/receive device. The first conductive element is then mounted to the second conductive element to form a junction of these conductive surfaces. This "sandwiches" the dielectric sheet between the conductive surfaces of the first and second conductive elements, thereby preventing contact of these elements. Thus, the present invention avoids the use of "direct current"-type coupling for conductive surfaces, thereby minimizing the opportunity for generating passive intermodulation products at this joint of a passive device.

More particularly described, the present invention provides a method and apparatus for suppressing passive intermodulation in a passive device having one or more conductive surface contacts. The passive device can include a first conductive surface and a second conductive surface. These conductive surfaces are not necessarily fabricated from the same type of metal, but are typically designed to be mated or otherwise joined to form a junction. For example, the first conductive surface can be an antenna connector and the second conductive surface can be a conductive surface along the body of an antenna. To avoid a continuous "direct" contact between these conductive surfaces, a dielectric sheet of dielectric material can be inserted between the first and second conductive surfaces. Thus, the junction formed in this manner can be viewed as a parallel plate-capacitive element. Indeed, if the junction has the appropriately-sized conductive surface area, then this capacitive element can present a low impedance of one Ohm or less at RF and microwave frequencies.

To achieve the desired goal of presenting a low impedance at the junction formed by the conductive surfaces, it may be appropriate to increase the effective surface area for one (or both) of the conductive surfaces. This can be accomplished by adding as required an appropriately-sized conductive plate comprising a conductive material to the surface of either the first conductive surface or the second conductive surface. The dielectric sheet can then be positioned between one of the conductive surfaces and the combination of the conductive plate and the remaining conductive surface. Other options for obtaining a low impedance value at this junction include (1) selecting a dielectric material having the appropriate dielectric constant, and (2) varying the spacing or "gap" between the two conductive surfaces.

One or more fasteners can be used for securely mounting the first conductive surface to the second conductive surface. If the fasteners also are fabricated of a conductive material, then each fastener can be inserted within a nonconductive sleeve, such as a shoulder washer having a shoulder connected to a sleeve. The shoulder of the shoulder washer can rest against the conductive surface of the second conductive surface, and the sleeve can pass through the second conductive surface. The combination of the fastener and the sleeve can then pass through the second conductive surface to connect with the first conductive surface, while maintaining electrical isolation between the first and second conductors.

One example of a passive device susceptible to the generation of passive intermodulation products is a diplex antenna capable of supporting multiple channel, high power applications for a communications system, such as a cellular telephone communications system. For this representative example, the first conductive element can be an antenna connector, such as a female-type receptacle, which can be connected to a source via a confined-path transmission device, such as a coaxial-type feed cable. The second conductive element is typically an exterior conductive surface of the chassis of the antenna. However, it will be understood that passive devices can encompass other types of electromagnetic components, such as filters or diplexers or the like, or combinations thereof.

For prior diplex antennas, the antenna connector has been connected directly to the chassis of the diplex antenna itself. To suppress the generation of passive intermodulation products, it is desirable to avoid direct contact between these conductive surfaces, while also presenting a low impedance at the junction formed by the antenna connector and the antenna. The insertion of dielectric material between the conductive surfaces prevents a physical contact of the antenna connector and the antenna chassis. Nevertheless, it may still be necessary to increase the capacitance exhibited by this junction to achieve the desired low impedance of approximately one Ohm or less. Indeed, in view of the relatively small surface area of the typical antenna connector, it may be necessary to firmly attach a conductive plate to a conductive surface of the connector to increase overall conductive surface area. By increasing the overall conductive surface area of the antenna connector, the capacitance presented at the junction formed by the antenna connector and the antenna is increased and the impedance at this junction is decreased. The dielectric sheet can now be placed between the conductive plate and the conductive surface of the antenna. The antenna connector is then securely mounted to the conductive antenna surface by one or more fasteners, thereby sandwiching the dielectric sheet between the antenna connector and the antenna.

Therefore, it is an object of the present invention to provide a method and apparatus for suppressing intermodulation distortion within passive devices.

It is a further object of the invention to provide a method and apparatus for suppressing passive intermodulation by use of capacitive coupling for junctions formed by conductive surfaces in a passive device.

It is a further object of the present invention to provide a method and apparatus for suppressing passive intermodulation without forming a continuous contact junction of conductive surfaces within a passive device.

It is a further object of the present invention to provide a method and apparatus for suppressing passive intermodulation that support efficient maintenance and replacement of junctions formed by conductive surfaces in a passive device.

These and other objects, features, and advantages of the present invention will become apparent from the consideration of the following detailed description and by reference to the accompanying drawings and claims.

DETAILED DESCRIPTION

While the invention is susceptible to various modifications and alternative forms, a specific embodiment thereof is shown by way of example in the drawings and will be described in detail. It should be understood, however, that this specific embodiment is not intended to limit the invention to the particular form described. On the contrary, the intention is to cover all modifications, equivalents, and alternatives falling within the spirit and scope of the invention as defined by the appended claims.

Specifically, the present invention is directed to the suppression of passive intermodulation distortion and will be described with respect to a representative passive device having a junction formed by at least two conductive surfaces. Specifically, this passive device is represented by a microwave diplex antenna for supporting cellular telephone communications applications. A first conductive surface can be supplied by the antenna connector and a second conductive surface can be supplied by the chassis of the antenna. However, those skilled in the art will appreciate that the present invention also encompasses the more general concept of suppressing passive intermodulation resulting from a junction formed by any two conductive surfaces of a passive device.

Figure 1:
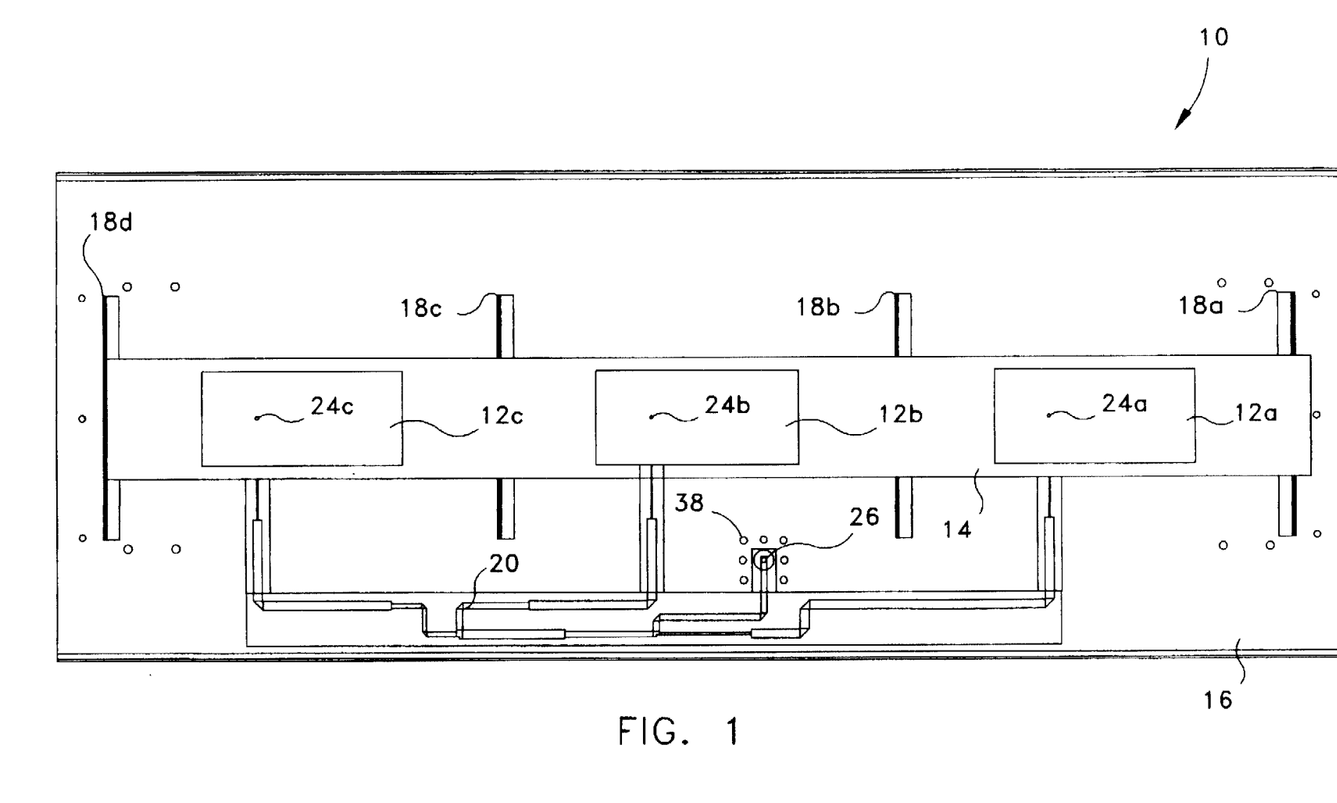
FIG. 1 is an elevation view of a "patch"-type antenna embodying the preferred environment of the present invention.
Figure 2:
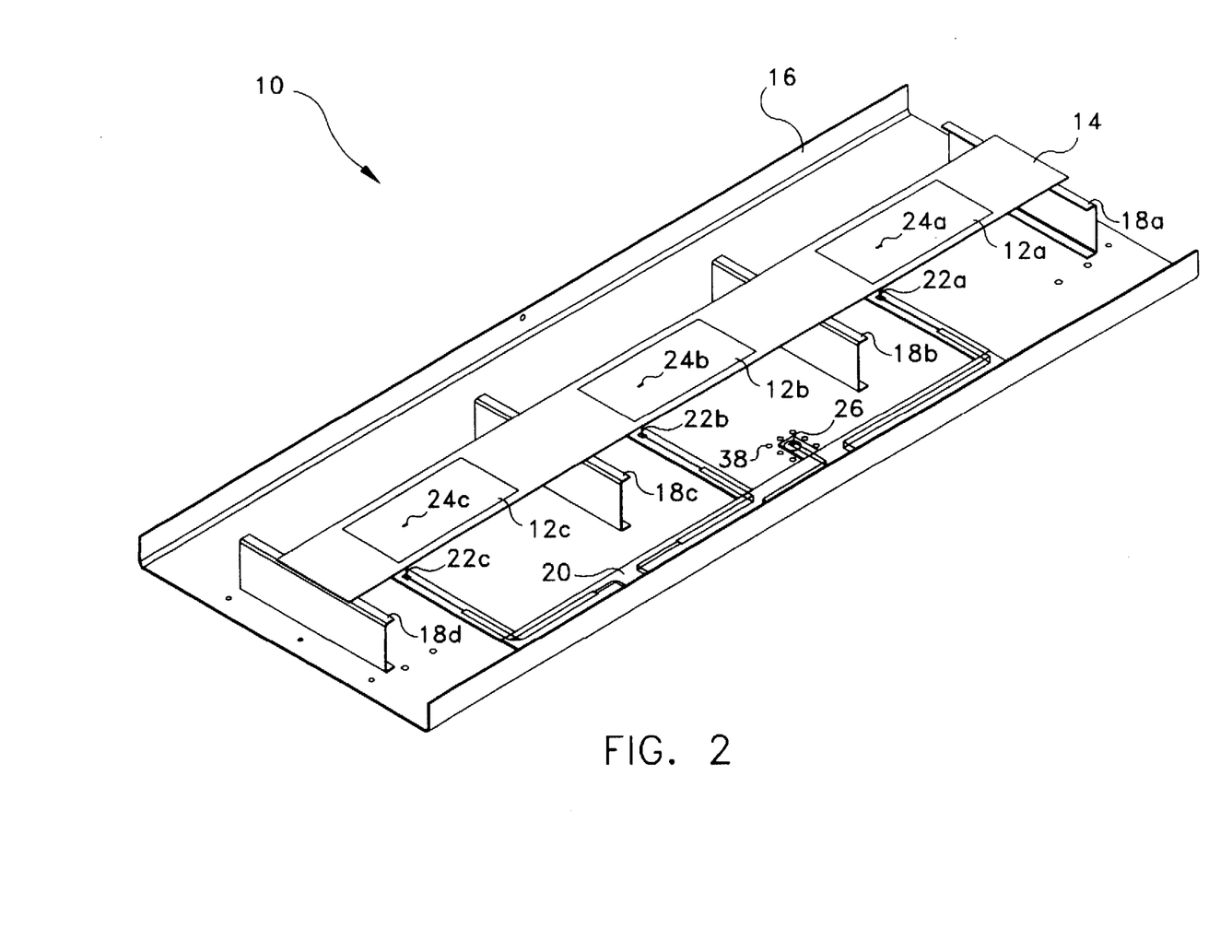
FIG. 2 is a perspective view of the antenna shown in FIG. 1.

Referring now to the drawings in which like numerals illustrate like elements throughout the several drawings, FIGS. 1 and 2 illustrate a patch-type antenna 10 representative of the environment for the preferred embodiment of the present invention. The antenna 10 comprises a stacked array of three radiating "patch" elements 12a–12c of conductive material mounted on the front surface of a substrate 14 comprising a rigid dielectric material. The substrate 14 is supported by supports 18a–18d connected to a tray 16. The tray 16, which is located parallel to the substrate 14 and, therefore, parallel to the patch elements 12a–12c, operates as a ground plane. The tray 16 is preferably fabricated of a conductive material, such as a single thin aluminum plate, typically having a thickness of 0.060 inches. Likewise, the supports 18a–18d are preferably fabricated from this type of conductive material.

The substrate 14 is preferably enclosed by the combination of the tray 16 and a protective radome (not shown) that is bound to the periphery of the tray 16 and extends around the front surface of the substrate 14. The radome, which is preferably a modified PVC assembly, permits the passage of electromagnetic signals during receive and transmit operations of the antenna 10. The combination of the tray 16 and the radome provides an enclosure that protects the antenna 10 from environmental influences, including ambient water and moisture.

The patch elements 12a–12c are conductive surfaces along the substrate 14 and form a vertical array of first-order mode radiating elements. By supporting the substrate 14, the supports 18a–18c also support the patch elements 12a–12c at a fixed height above the conductive interior surface of the tray 16.

To accommodate the stacking of the patch elements 12a–12c, the substrate 14 is preferably elongated in the vertical direction rather than in the horizontal direction. The patch elements 12a–12c are mounted on the front surface of the substrate 14 at equally-spaced intervals, as shown in FIG. 1, and are located in a common vertical plane. The vertically stacked array of patch elements, also described as patches, of the antenna 10 supports angular sector coverage in both azimuth and elevation. This characteristic is particularly desirable for supporting both receive and transmit operations for cellular telephone applications.

A distribution network 20, which is supported by the tray 16, distributes electromagnetic signals to and from the patches 12a–12c. The distribution network 20, which is preferably implemented as a microstrip design, supplies an appropriate impedance match between the patch elements 12a–12c and a feed cable connected to the antenna 10, thereby suppressing signal reflections along this transmission path. In addition, the distribution network 20 includes a power divider for distributing signals to each of the patch elements 12a–12c.

The distribution network 20 is connected to each of the patch elements 12a–12c via separate probes 22a–22c(See FIG. 2). Each probe 22a–22c is connected to a corresponding feed point 24a–24c located along the respective patch elements 12a–12c. In particular, the probes 22a–22c are embedded within the substrate 14 and connected directly to the respective radiating elements 12a–12c via feed points 24a–24c. Accordingly, it will be understood that the feed points 24a–24c, which are also commonly described as "launch" points, supply signal connections for the patches 12a12c. Because the patch elements 12a–12c are supported at a fixed height above the conductive surface of the tray 16 by the supports 18a–18d, the probes 22a–22c can be implemented by a thin conductive bus wire.

With respect to the design parameters of the patch antenna 10, those skilled in the art will appreciate that the length of each patch element 12a–12c affects the resident operating frequency, the width of each patch element 12a–12c affects the beamwidth, and the fixed height of each radiating element 12a–12c above the tray 16 affects the percentage of frequency span or bandwidth. The gain of the antenna 10 can be increased by stacking additional patch elements 12a–12c to a vertical array having sufficient length to support the 20 addition of these elements.

In view of the foregoing, it is generally preferable that the width of each patch element 12a–12c be between 0.25 and 0.75 of the wavelength for the center frequency of the operating band. The "sector coverage," i.e., azimuth or horizontal beamwidth, is controlled by the physical width or horizontal dimension of the patch elements 12a–12c. In general, the wider a patch element, the narrower the sector coverage of the antenna 10. In addition, it is generally preferable that the fixed height of each patch element 12a–12c above the conductive surface of the tray 16 be between 0.075 and 0.25 of the wavelength at the center frequency of the operating band.

The antenna 10, which is primarily intended to support typical cellular telephone communications applications, preferably operates within the frequency band of approximately 805–896 MHz. However, those skilled in the art will appreciate that the antenna dimensions can be "scaled" to support communications operations within the Personal Communications Services (PCS) frequency range of 1.8–2.2 GHz. Likewise, the design of the antenna 10 can be scaled to support European communications applications, including operation within the Global Standard for Mobile Communications (GSM) frequency range of 870–960 MHz or the European Personal Communications Network (PCN) frequency range of 1710–1880 MHz. These frequency ranges represent examples of operating bands for the antenna 10; however, the present invention is not limited to these frequency ranges, but can be extended to frequencies both below and above the frequency ranges associated with cellular telephone applications.

A typical cellular telephone communications system includes a relatively high power transmitter and uses multiple transmit channels spread over a predefined frequency range. Accordingly, it will be understood that the preferred antenna 10 can operate within a high power environment and supports both receive and transmit operations for a typical cellular telephone communications system. For one embodiment of the antenna 10, power handling capacity is specified at 500 Watts continuous wave (CW) operation. This operating environment of high power, diplex operation can support the possible generation of passive intermodulation products during transmit operations. In turn, a portion of these products can fall within the receive frequency band of the communications system . Accordingly, the preferred embodiment addresses this problem by the use of capacitive coupling at certain joints formed by conductive surfaces of the antenna 10. As described in more detail below with respect to FIGS. 1–5, a representative example of a junction formed by conductive surfaces in the antenna 10 is the joint formed by an antenna connector 26 and the tray 16.

The distribution network 20 can be connected to a confined-path transmission device, such as a feed cable for the antenna 10, via the antenna connector 26. The antenna connector 26 is preferably mounted on the chassis of the antenna 10, specifically the exterior surface of the tray 16. The antenna connector 26 is typically implemented by a female-type coaxial receptacle capable of accepting a male-type coaxial connector associated with a coaxial feed cable.

For the frequency ranges typically associated with cellular telephone applications, the antenna connector 26 is preferably an N-type (or 7/16-type) coaxial receptacle for accepting a center conductor and a separate ground path. For the N-type coaxial receptacle, the portion of the antenna connector 26 for receiving the center conductor is generally associated with the primary signal carried by the feed cable. In contrast, the ground path portion of the antenna connector 26 typically accepts the threaded outer shell of the male connector to complete a ground path.

Figure 3:
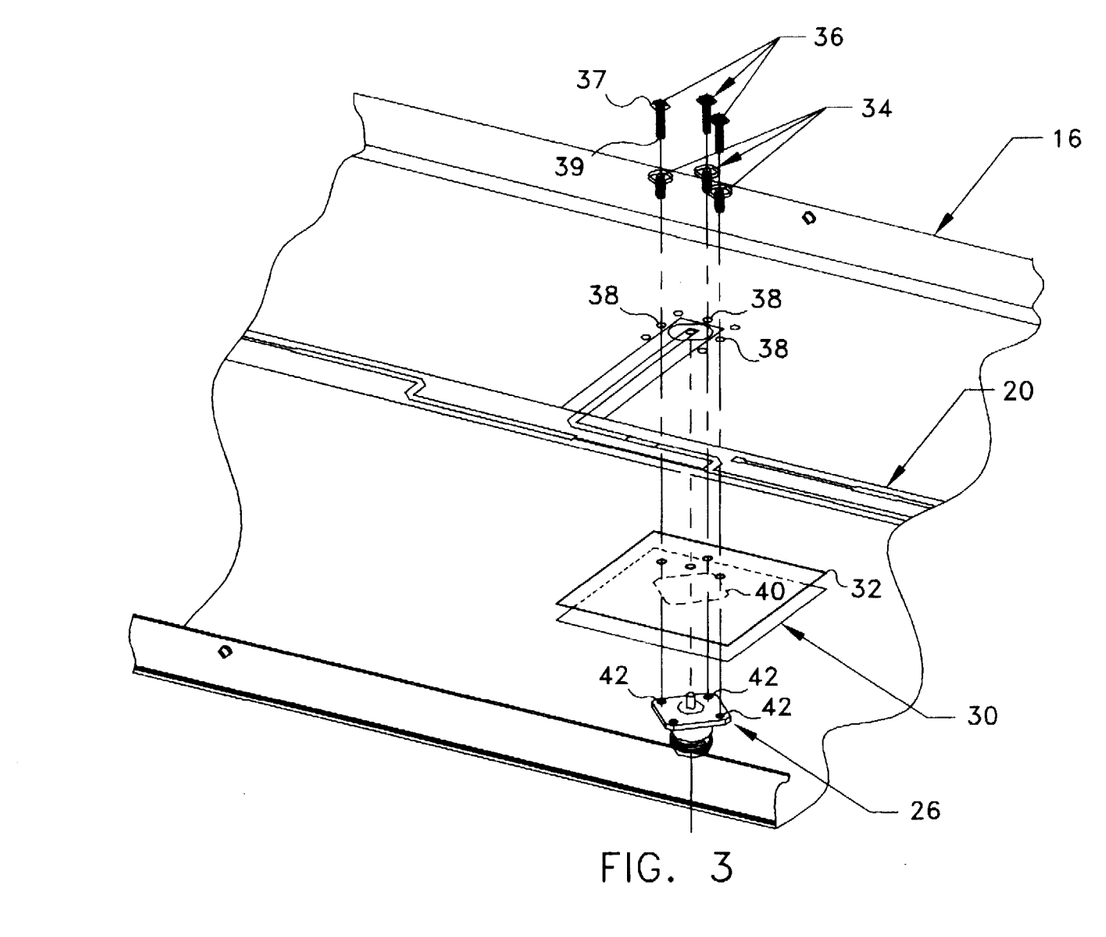
FIG. 3 is an exploded view of the preferred embodiment of the present invention within the environment of the antenna of FIG. 1.
Figure 4:
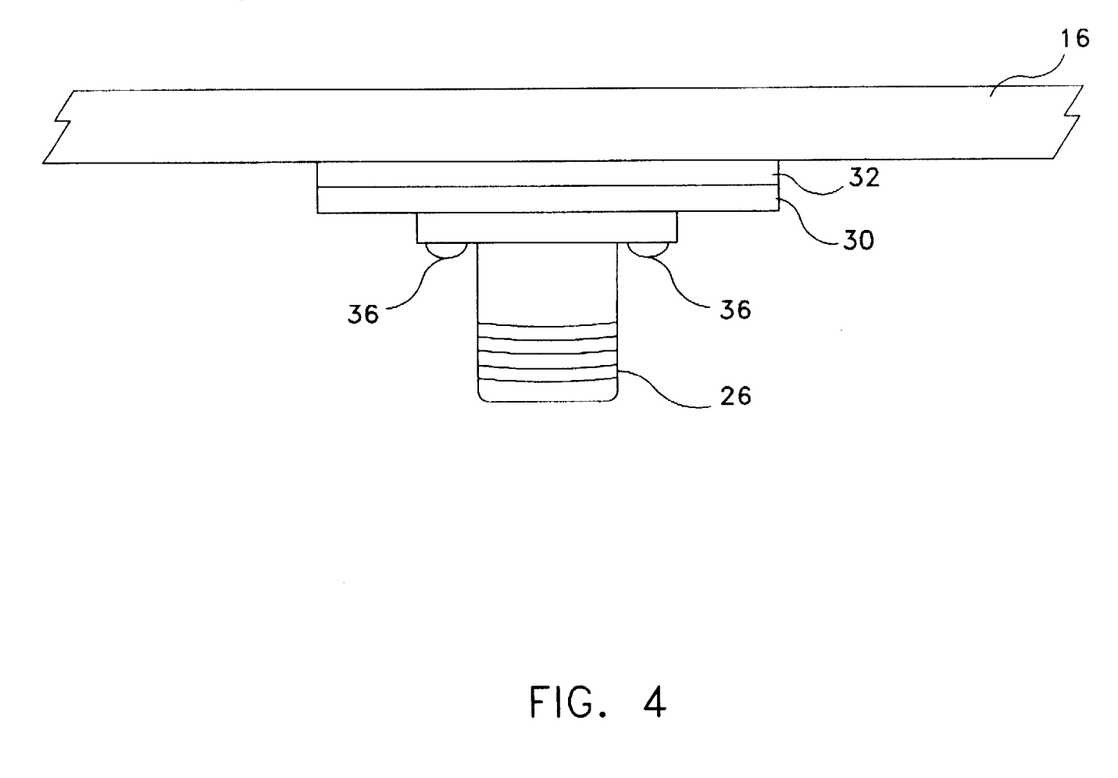
FIG. 4 is a perspective view of the preferred embodiment of the present invention within the environment of the antenna of FIG. 1.

FIGS. 3 and 4 supply detailed illustrations of the junction formed by the antenna connector 26 and the tray 16. Referring now to FIGS. 3 and 4, a dielectric sheet 32 of dielectric material is inserted between a conductive surface of the antenna connector 26 and the conductive rear surface of the tray 16. The formation of a metal-to-metal junction is prevented by sandwiching the dielectric sheet 32 between the respective conductive surfaces of the tray 16 and the antenna connector 26. The dielectric sheet 32 comprises a nonconductive material, such as a dielectric material, and is sized to ensure that the conductive surface of the antenna connector 26 does not directly contact the chassis of the antenna 10. In particular, the dielectric sheet is preferably sized to match the size of the conductive surface of the antenna connector 26. In this manner, the antenna connector 26 is electrically isolated from the rear surface of the tray 16. By eliminating the opportunity for a continuous "physical" contact to occur at this critical junction of the antenna 10, the desired result of suppressing the generation of passive intermodulation distortion can be achieved.

The dielectric material of the dielectric sheet 32 can include most nonconductive materials. However, preferred dielectric materials have a dielectric constant between 2.0 and 6.0. Representative dielectric materials include nylon, polystyrene, Teflon, and certain adhesives.

The insertion of dielectric material between the conductive surfaces of the antenna connector 26 and the tray 16 preferably forms a junction representing a parallel plate capacitive element having a low impedance for the frequency spectrum of cellular telephone communications applications. Specifically, to support the suppression of passive intermodulation products, it is desirable to present at this joint a low reactive impedance of approximately one Ohm or less in series with the ground of the antenna chassis. This impedance level can be generally viewed as function of the electrical characteristics of the selected dielectric material, the surface area of the "plates", i.e., the pair of conductive surfaces, and the spacing of the conductive surfaces. Those skilled in the art will further appreciate that the impedance value for this capacitively-coupled junction is frequency dependent.

It will be appreciated that the conductive surface of a typical antenna connector or receptacle is relatively small. Accordingly, for RF and microwave frequency ranges, it may be necessary to also add a conductive plate, such as the conductive plate 30, along a portion of the antenna connector 26 to increase the overall area of the conductive surface associated with the antenna connector. A junction formed with this increased conductive surface area will exhibit an increased capacitance value and a decreased impedance value.

In view of the foregoing, it will be understood that the conductive surface of the antenna connector 26 should be of sufficient size to present the desired low impedance of 1 Ohm or less at the junction formed by the dielectric sheet 32 and the conductive surfaces of the antenna connector 26 and the tray 16. Otherwise, an appropriately-sized conductive plate 30 can be bonded or fused to the conductive surface of the antenna connector 26 to effectively increase the overall size of this conductive surface. Other options for achieving the desired low impedance include varying the thickness of the selected dielectric material of the dielectric sheet 32 or selecting a dielectric material having an appropriate dielectric constant.

In view of the limited conductive surface area of the typical N-type coaxial-type connector, it is preferable to securely mount or bond a conductive plate 30 of conductive material to a non-receptacle conductive portion of the antenna connector 26. This combination of the conductive surface of the antenna connector 26 and the conductive plate 30 produces one of the two "plates" of the desired capacitive-coupled junction; the remaining plate is formed by the conductive surface of the antenna tray 16 itself. This pair of "plates" is separated by the dielectric sheet 32 to form a junction that can be viewed as a parallel plate capacitive element. Thus, the preferred capacitive-coupled junction for the above-described antenna application is formed by positioning the dielectric sheet 32 between the antenna tray 16 and the combination of the conductive plate 30 with the antenna connector 26.

For this embodiment, one side of the conductive plate 30 can be bonded to a portion of the antenna connector 26. The dielectric sheet 32 can then be attached to the remaining side of the conductive plate 30. The dielectric sheet 32 is preferably sized to match the dimensions of the conductive plate 30 to prevent direct contact by conductive surfaces when the antenna connector 26 is connected to the tray 16.

The preferred antenna connector 26 is plated with a tin-lead-zinc plating which supports the soldering or welding of the conductive plate 30 to the antenna connector 26. An N-type female receptacle having tin-lead-zinc plating is available from Huber & Suhner, Inc. of Woburn, MA, as part number 23N-500-23/133. One side of the conductive plate 30 can be directly soldered to a portion of the preferred antenna connector 26, thereby securely bonding the conductive plate to this connector.

The dielectric sheet 32 is preferably implemented by a dielectric material supplied by a double-sided transfer adhesive known as "SCOTCH VHB", marketed by 3M Corporation of St. Paul, Minn., and identified by part number EPQ473PC. The double-sided adhesive nature of the preferred dielectric sheet 32 supports convenient installation of the dielectric material to the tray 16 and the antenna connector 26. Specifically, installation can be completed by affixing one adhesive side of the dielectric sheet 32 to the conductive plate 30 and the remaining adhesive side to the tray 16. In this manner, the adhesive surfaces of the preferred dielectric sheet 32 are affixed both to the conductive plate 30 and to the rear surface of the tray 16. For the preferred embodiment, the dielectric sheet is approximately sized as 2 inches length×2 inches wide×0.01 inches thick.

Referring still to FIGS. 3 and 4, although the adhesive on the preferred dielectric sheet 32 is useful for affixing the antenna connector 26 to the antenna 10, it will be appreciated that a more rigid mounting is desirable in view of the typical field environment of the antenna. Accordingly, one or more fasteners 36 can be used to securely mount the antenna connector 26 to the tray 16. The preferred fastener 36 is an aluminum rivet having a pre-formed head 37 positioned at one end of the fastener and a tip 39 located at the other end.

In view of the conductive nature of this type of fastener, each of the fasteners 36 can be inserted within a corresponding nonconductive sleeve prior to forming the joint between the conductive surfaces of the antenna connector 26 and the tray 16. At least a portion of the fastener is placed within a sleeve 34 such that the fastener head 37 extends from one end of the sleeve 34 and the fastener tip 39 extends from the other end of the sleeve 34. The sleeve 34 containing the fastener 36 can then be inserted through mounting holes 38 located along the tray 16. This allows the insertion of the fastener tip 39 through an opening 40 within the conductive plate 30, an appropriately sized hole in the dielectric material 32, and into an aligned mounting hole 42 in the antenna connector 26. The sleeve 34 provides electrical isolation between the conductive surface of the tray 16 and the fastener 26 by preventing physical contact between these components. Accordingly, the sleeve 34 provides a shield of nonconductive material for that portion of the fastener 36 which would normally come into contact with the conductive surfaces of the tray 16 in the absence of the sleeve 34. Upon inserting the fastener tip 39 within the mounting hole 42 of the antenna connector 26, the fastener tip 39 can be deformed to secure the fastener 36 to the antenna connector 26.

Although the preferred fastener 36 is an aluminum rivet, it will be appreciated that other types of fasteners or connecting devices can be used to securely mount the antenna connector 26 to a conductive surface of the antenna 10. For example, alternative fastening means include a threaded screw and a bolt with corresponding nut. However, the aluminum rivet is preferred over these alternative fastening means because of ease of installation during the assembly of the antenna 10 and the tensile strength offered by a joint formed with this type of fastener.

The sleeve 34 is preferably a shoulder washer fabricated from nylon or another type of rigid nonconductive material. The "shoulder" portion of this shoulder washer supplies the desired isolation between the head of the preferred aluminum rivet and the interior surface of the tray 16. Those skilled in the art will appreciate that the sleeve 34 should be compatible with the construction of the corresponding fastener 36. Accordingly, other types of sleeves 34 can be used with the present invention to supply the desired electrical isolation between conductive surfaces of the antenna 10 and each of the fasteners 34. In addition, it will be understood that use of the sleeve 34 is not necessarily required if the fastener 36 is manufactured from a nonconductive material.

Figure 5:
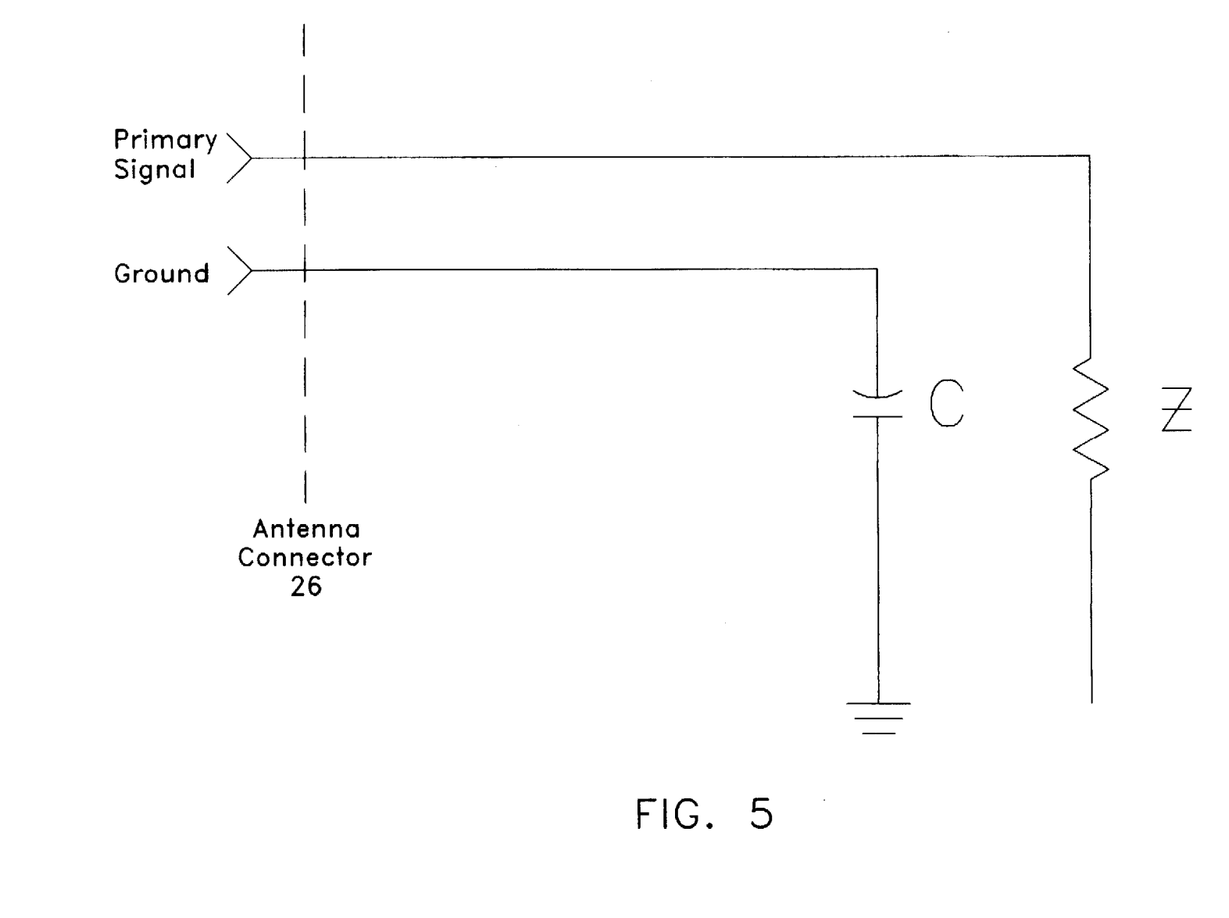
FIG. 5 is an electrical schematic illustrating the electrical connections of the preferred embodiment of the present invention in FIG. 3.

FIG. 5 is an electrical schematic showing the junction formed by the connection of the antenna connector 26 to a conductive surface of the antenna 10. Referring to FIGS. 3–5, the antenna connector 26 preferably supports two separate signal paths, specifically a desired primary signal path and a ground or return path. For a coaxial-type female receptacle, the primary signal path is typically associated with the portion of the receptacle that accepts the center pin of the corresponding male connector. The ground path is associated with the threaded portion of the receptacle which accepts the threaded outer shell of this male connector. Accordingly, the signal path between the antenna connector 26 and the antenna 10 is electrically represented by a transmission path connected to an antenna load having an impedance Z. The impedance Z is preferably a reactive impedance of one Ohm or less. The ground path between the antenna connector 26 and the antenna 10 is electrically represented by a series capacitor C connected to RF ground rather than DC ground of the antenna 10. In this manner, the center conductor of the feed cable passes the desired signal to the electrical load represented by the antenna 10. In contrast, the exterior conductor of the feed cable is connected to RF ground via a series "parallel plate" capacitor formed by the placement of the dielectric sheet 32 between the antenna connector 26 and the tray 16.

It will be understood that the present invention is not limited to the above-described example of connecting the conductive surfaces of an antenna connector to an antenna. Indeed, the present invention can be extended to any two conductive surfaces forming a junction in a passive electrical device operable in an environment associated with the communication of electromagnetic signals.

Figure 6:
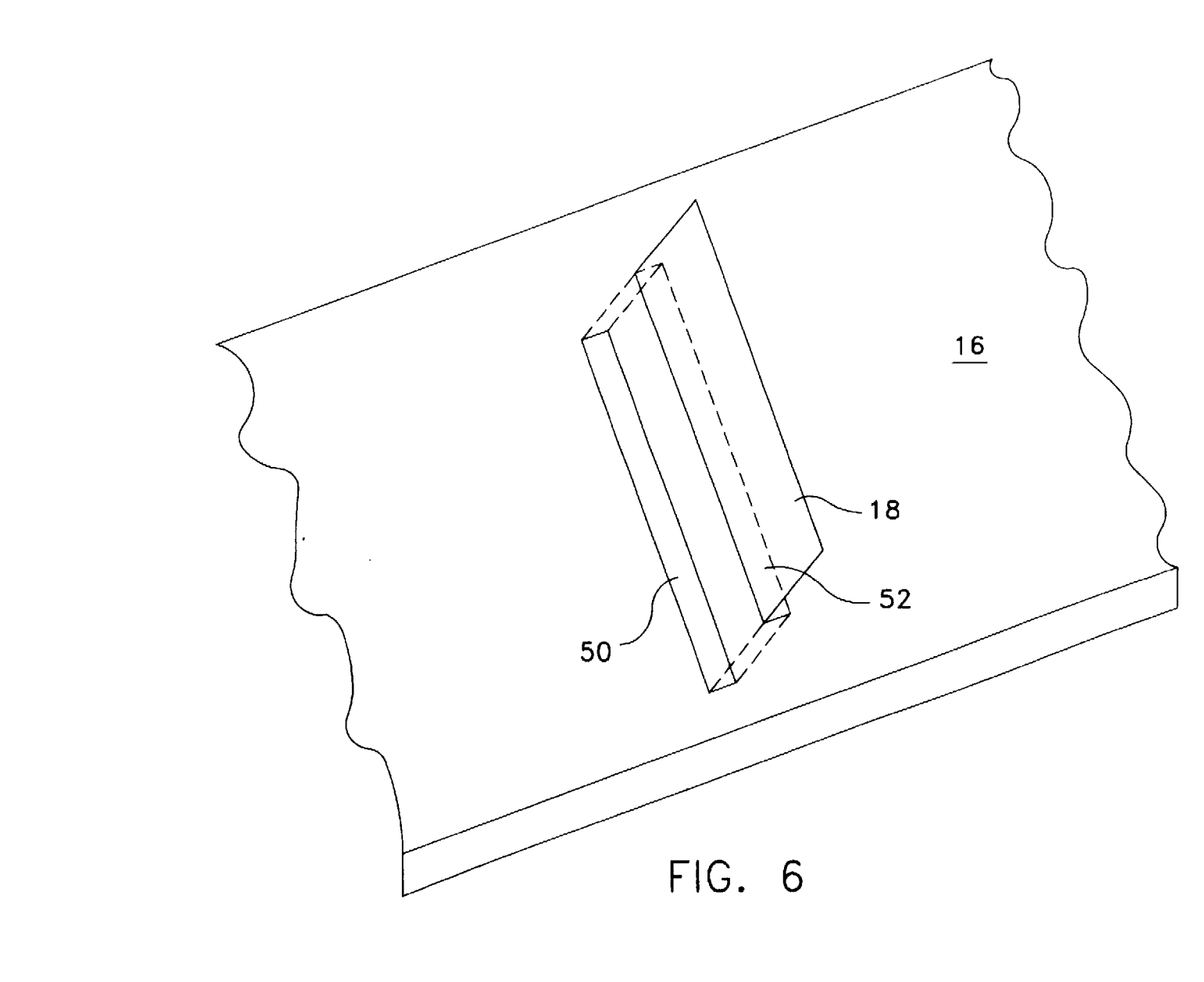
FIG. 6 is an exploded view of an alternative embodiment of the present invention within the environment of the antenna of FIG. 1.

For example, the inventive concept of inserting dielectric material between two conductive surfaces of a passive device can be extended to other metal-to-metal surfaces within the environment of the antenna 10. As shown in FIG. 6, another possible application of the present invention is at the joints formed by the conductive surfaces for the supports 18a–18d (as best shown in FIG. 2) and the tray 16. Referring to FIGS. 3 and 6, passive intermodulation distortion can be further suppressed within the antenna 10 by inserting a dielectric sheet 50 comprising dielectric material between each of the conductive surfaces of the supports 18a–18d and the conductive surface of the tray 16. This insertion of dielectric material forms a capacitive-coupled connection at these junctions, thereby avoiding the metal-to-metal joints normally associated with the generation of the passive intermodulation phenomenon.

Similar to the previously described dielectric sheet 32, the dielectric sheet 50 is preferably fabricated the double-sided transfer adhesive marketed by 3M Corporation as "SCOTCH VHB". Convenient installation of a support 18 is achieved by affixing the adhesive surface of one side of the dielectric sheet 50 to the bottom surface 52 of a support 18 and the adhesive surface on the remaining side to the interior or top surface of the tray 16. The dielectric sheet 50 is sized to preferably match the dimensions of the bottom surface 52. In this manner, a layer of dielectric material physically separates the conductive surfaces of the bottom surface 52 and the tray 16. In addition, the double-sided adhesive nature of the preferred dielectric sheet 50 also supports the bonding or mounting of the support 18 to the tray 16.

In view of the foregoing, the placement of the dielectric sheet 50 between the conductive surfaces of a support 18 and the tray 16 prevents the formation of a continuous contact junction. Instead, this junction exhibits the characteristic of electrical isolation between the two conductive surfaces. This results in the suppression of passive intermodulation distortion that might otherwise occur at this joint during diplex operations of the antenna 10.

For the preferred antenna 10 incorporating the present invention, passive intermodulation performance is specified at less than −105 dBm for a 16 channel cellular telephone communications system operating at 15 Watts per channel.

Another benefit of capacitive coupling of conductive surfaces within a device such as the antenna 10 is the prevention of the phenomenon known as the galvanic effect, which typically occurs when two different conductive materials are in contact and results in oxidation of at least one of the materials. The galvanic effect results in the eventual deterioration of the dissimilar conductive surfaces of a metal-to-metal joint. Thus, by using capacitive coupling rather than a direct contact connection, the present invention provides the additional advantage of preventing deterioration of a metal-to-metal joint as a result of galvanic corrosion. It will be appreciated that the present invention effectively serves to extend the life of a device such as the antenna 10 by extending the life span of its connected conductive surfaces.

Figure 7:
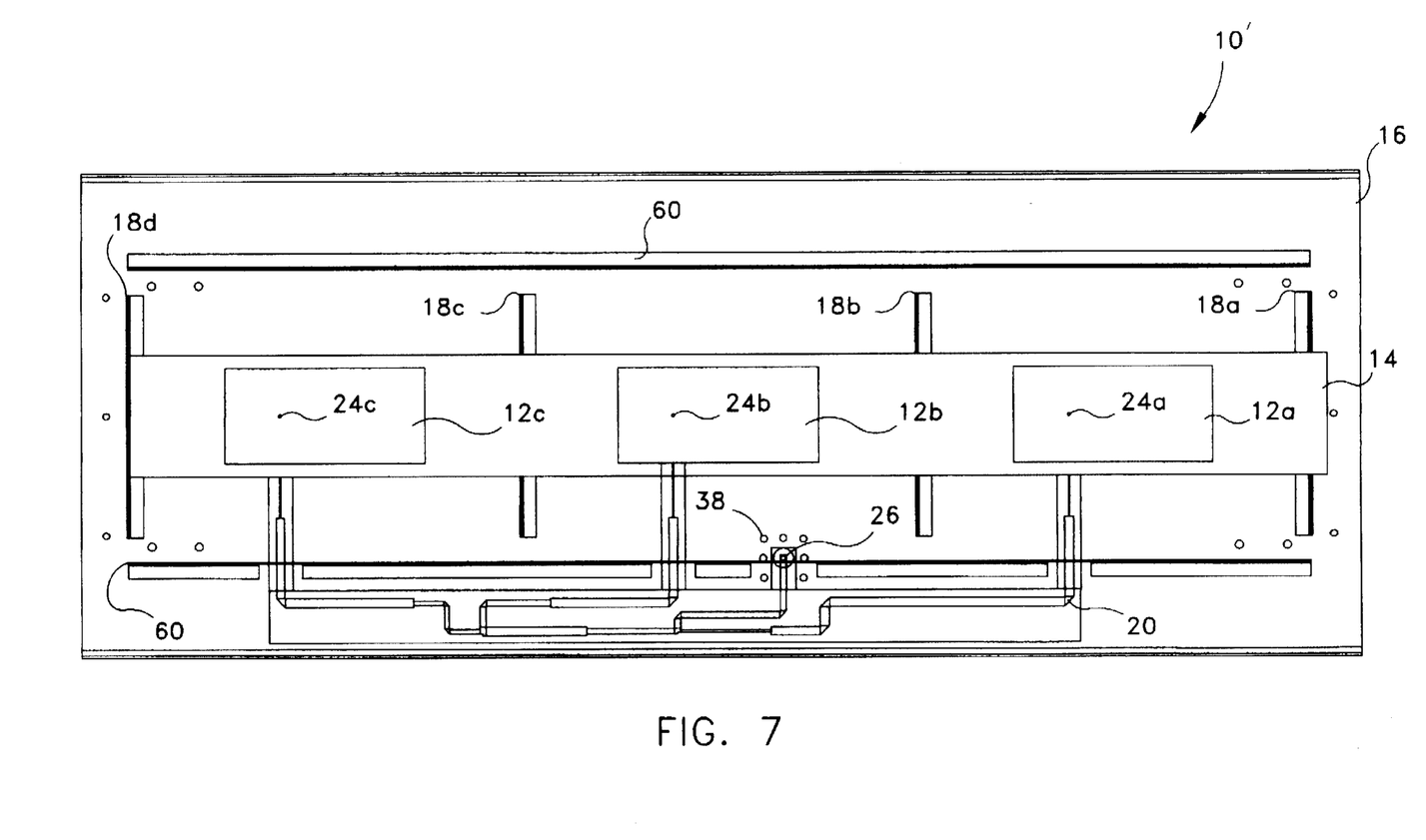
FIG. 7 is an elevation view of another antenna including a pair of beam spreaders to increase the effective beamwidth of the antenna.
Figure 8:
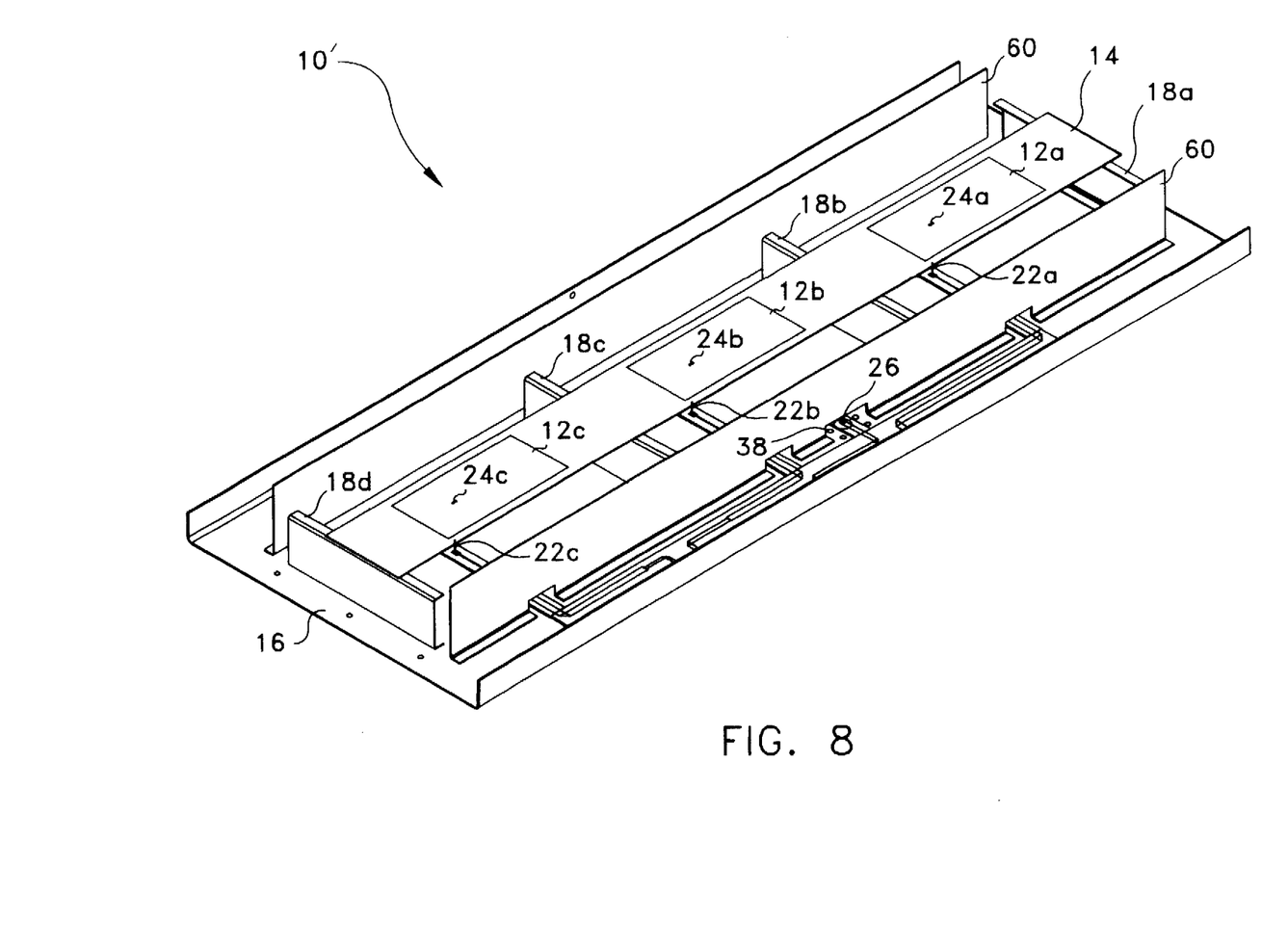
FIG. 8 is a perspective view of the antenna illustrated in FIG. 7.

Turning now to another embodiment of the present invention, FIGS. 7 and 8 respectively illustrate elevation and perspective views of an antenna 10' including a pair of parallel, spaced-apart walls 60 mounted between the substrate 14 and operative to "spread" or otherwise increase the effective beamwidth of the antenna 10'. Referring to FIGS. 7 and 8, the walls 60 comprise a conductive material, such as aluminum sheeting, and are mounted to the interior surface of the tray 16 along either side of the substrate 14 supporting the patch elements 12a–12c. The distance extending between the parallel, spaced-apart walls 60 is preferably greater than the width of the supports 18a–18d and less than the width of the tray 16. The height of each of the walls 60, as measured from the tray 16, is preferably greater than the height of the substrate 14. Thus, the height of the walls 60 is also greater than the height above the tray 16 for each of the patch elements 12a–12c. In this manner, the walls 60 operate in tandem to interfere with the fringe fields generated by the radiating patch elements 12a–12c, thereby effectively spreading the beamwidth of the antenna 10'. In particular, the inventor has determined that the 3dB beamwidth of the antenna 10' is proportional to both the width of each radiating patch element 12 and the height of the walls 60.

In summary, the present invention is useful in the environment of a passive device that supports the operation of a communications system capable of transmitting electromagnetic signals and receiving electromagnetic signals, i.e., a transmit/receive or diplex device. To suppress passive intermodulation distortion generated during high power transmission operations, the present invention inserts a dielectric sheet comprising dielectric material between first and second conductive elements of the passive device. The second conductive element is then mounted to the first conductive element, thereby "sandwiching" the dielectric sheet between the first and second conductive elements. In this manner, the first conductive element is capacitively coupled to the second conductive element. This avoids the formation of a continuous contact joint between these conductive elements, thereby minimizing the opportunity for the generation of passive intermodulation products at this joint of the passive device.

In view of the foregoing, it will be appreciated that the present invention provides the advantage of supplying a robust solution to the suppression of passive intermodulation. The innovative use of capacitive coupling for connecting conductive surfaces in an electrical device supports the opportunity to complete repeated connections of a joint formed by these conductive surfaces. A practical application of the present invention is within the environment of a diplex antenna, in which there is a need to both connect and disconnect the antenna connector and the feed cable connector during antenna maintenance operations. Significantly, this passive intermodulation suppression technique does not deform or otherwise fuse the connection formed by a cable connector and a device connector.

From the foregoing description of the preferred embodiment, it will be appreciated that the present invention overcomes the disadvantages of the prior art and achieves the objects and advantages of the invention recited above. From the description, other embodiments will suggest themselves to those skilled in the art. Therefore, the scope of the present invention is to be limited only by the claims below.

I claim:

1. In a passive device for supporting the transmission and reception of electromagnetic signals, the passive device having a plurality of junctions formed by a first conductive element and a second conductive element, a method of suppressing the generation of passive intermodulation, comprising the steps:

for each junction, inserting a dielectric sheet comprising dielectric material between the first conductive element of the passive device and the second conductive element of the passive device; and mounting the first conductive element to the second conductive element, the dielectric sheet being located between the first conductive element and the second conductive element to prevent the formation of a direct connection between the first conductive element and the second conductive element, thereby suppressing the generation of passive intermodulation by each junction of the passive device.

2. The method recited by claim 1, wherein the first conductive element, the dielectric sheet, and the second conductive element form a junction of the passive device, the junction presenting an impedance of less than approximately one Ohm.

3. In a transmit/receive device for supporting the operation of a high power communications system having multiple transmit channels for transmitting electromagnetic signals and a receive channel for receiving electromagnetic signals, a method for reducing interference within the receive channel by suppressing the generation of passive intermodulation by the transmit/receive device, comprising the steps:

inserting a dielectric sheet comprising dielectric material between a conductive element of the transmit/receive device and a conductive surface of a connector for connecting to the transmit/receive device a confined-path transmission device extending from the communications system, the transmission device comprising a primary signal path and a ground path;

mounting the connector to the conductive element of the transmit/receive device, the dielectric sheet being located between the connector and the conductive element to form a junction that prevents the formation of a direct connection between the conductive surface of the connector and the conductive element of the receive/transmit device;

wherein the junction is operative as a series capacitor in the ground path, thereby suppressing the generation of passive intermodulation at the junction; and wherein the high power communications system has a power handling capacity of approximately 500 Watts continuous wave operation.

4. The method recited by claim 3, wherein the connector, the dielectric sheet, and the conductive element form a junction of the transmit/receive device, the junction presenting an impedance of less than approximately one Ohm at the operating frequency of the communications system.

5. A method for suppressing the generation of passive intermodulation by a diplex antenna, comprising the steps:

inserting a dielectric sheet of dielectric material between a conductive element of the diplex antenna and a connector for connecting a feed cable to the diplex antenna; and mounting the connector to the conductive antenna element, the dielectric sheet being located adjacent to the antenna connector and to the conductive antenna element to prevent a direct connection between the conductive antenna element and the antenna connector, thereby suppressing the generation of passive intermodulation by the diplex antenna, the mounting step comprising the steps of:

inserting a sleeve through an opening on the conductive antenna element, one end of the sleeve located on one side of the conductive antenna element and a remaining end of the sleeve located on the other side of the conductive antenna element;

placing a portion of a fastener within the sleeve, a head of the fastener extending from the one end of the sleeve and a tip of the fastener extending from the remaining end of the sleeve; and inserting the tip of the fastener through an opening in the dielectric sheet and into an aligned mounting hole on the connector, the fastener being electrically isolated from the conductive antenna element by the sleeve.

6. The method recited by claim 5, wherein the connector, the dielectric sheet, and the conductive antenna element form a junction of the diplex antenna, the junction presenting a low impedance.

7. An apparatus for suppressing the generation of passive intermodulation by a diplex antenna having a conductive element, the diplex antenna supporting the communications operations of a high power communications system, comprising:

a connector for connecting the diplex antenna to a confined-path transmission device that extends from the communications systems;

a dielectric sheet of dielectric material; and at least one fastener for securely mounting the connector to the conductive element of the diplex antenna, wherein each fastener is inserted within a sleeve that passes through an opening in the conductive element of the diplex antenna to electrically isolate the fastener from the conductive element;

the dielectric sheet being positioned between the conductive element and the connector to prevent the formation of a direct physical connection between the connector and the conductive element, wherein the connector, the dielectric sheet, and the conductive element form a junction presenting a low impedance, thereby suppressing the generation of passive intermodulation at the junction.

8. The apparatus recited in claim 7, wherein the confined-path transmission device comprises a primary signal path and a ground path, the junction formed by the connector, the dielectric sheet and the conductive element operative as a capacitor in the ground path and presenting a low reactive impedance between zero Ohm and one Ohm.

9. The apparatus recited in claim 7, wherein the antenna connector further comprises a conductive plate, the conductive plate being firmly connected to a conductive surface of the antenna connector to increase the effective size of the conductive surface.

10. An apparatus for suppressing the generation of passive intermodulation by a passive device, comprising:

a plurality of first conductive surfaces of the passive device;

a plurality of second conductive surfaces of the passive device;

a plurality of dielectric sheets of dielectric material, each dielectric sheet being located between a corresponding first conductive surface and a corresponding second conductive surface to prevent the formation of a direct connection of conductive surfaces, wherein each dielectric sheet and its corresponding first and second conductive surfaces form one of a plurality of junctions of the passive device, thereby suppressing the generation of passive intermodulation at each junction.

11. The apparatus recited by claim 10, wherein the junction of the passive device presents an impedance of less than approximately one Ohm.

12. The apparatus recited by claim 10 further comprising at least one fastener for mounting the first conductive surface to the second conductive surface.

13. An apparatus for suppressing the generation of passive intermodulation in an antenna capable of receive and transmit operations, the antenna including a conductive antenna element, comprising:

a connector for connecting a feed cable to the antenna;

a conductive plate attached to a conductive surface of the connector;

a dielectric sheet of dielectric material conductive antenna element to prevent the formation of a direct connection between the connector; and at least one fastener for mounting the antenna connector to the conductive antenna element, each fastener inserted within a nonconductive sleeve that passes through the conductive antenna element to electrically isolate the conductive antenna element from each fastener, the dielectric sheet positioned between the conductive plate and the conductive antenna element to prevent the formation of a direct connection of conductive surfaces between the connector and the conductive antenna element, thereby suppressing the generation of passive intermodulation.

14. The apparatus as recited in claim 13, wherein the conductive plate is bonded to said connector.

15. The apparatus as recited in claim 14, wherein the connector comprises a plating capable of accepting solder to allow the conductive plate to be soldered to the connector.

16. The apparatus as recited in claim 13, wherein the dimensions of the conductive plate are selected to supply a low impedance at a junction formed by the connector, the dielectric sheet, and the conductive antenna element for the selected frequency of operation of the antenna.

17. The apparatus as recited in claim 16, wherein the low impedance is less than approximately one Ohm.

18. An apparatus for suppressing the generation of passive intermodulation by a diplex antenna having a plurality of conductive elements, the diplex antenna supporting the communications operations of a high power communications system capable of receive and transmit operations, comprising:

a dielectric sheet of dielectric material, the dielectric sheet being positioned between adjacent conductive elements to prevent the formation of a direct physical connection between the conductive surfaces of the conductive elements;

at least one fastener for securely mounting the adjacent conductive elements to opposite sides of the dielectric sheet;

a confined-path transmission device connecting the diplex antenna and the high power communications system, the transmission device comprising a primary signal path and a ground path, wherein the adjacent conductive elements and the dielectric sheet form a junction operative as a series capacitor in the ground path, thereby suppressing the generation of passive intermodulation by the diplex antenna, and wherein the adjacent conductive elements and the dielectric sheet form a junction presenting a low reactive impedance between zero Ohm and one Ohm.

19. The apparatus recited in claim 18, wherein each fastener is inserted within a corresponding nonconductive sleeve that passes through aligned openings in each of the adjacent conductive elements of the diplex antenna to electrically isolate the fastener from the adjacent conductive elements.

\* \* \* \* \*

UNITED STATES PATENT AND TRADEMARK OFFICE
CERTIFICATE OF CORRECTION

PATENT NO. : 5,757,246

DATED : May 26, 1998

INVENTOR(S) : Johnson

It is certified that error appears in the above-identified patent and that said Letters Patent is hereby corrected as shown below:

Col. 14, line 51, delete the word "systems" and insert the word --system-- in place thereof.

Col. 15, lines 41-43, delete the phrase "conductive antenna element to prevent the formation of a direct connection between the connector".

Signed and Sealed this

Twenty-fifth Day of May, 1999

*Attest:*

Q. TODD DICKINSON

*Attesting Officer*     *Acting Commissioner of Patents and Trademarks*